(12) United States Patent
Campbell et al.

(10) Patent No.: US 12,043,398 B2
(45) Date of Patent: Jul. 23, 2024

(54) PROPULSION ASSEMBLY

(71) Applicant: Bell Textron Inc., Fort Worth, TX (US)

(72) Inventors: Kip Gregory Campbell, Hurst, TX (US); Kristen Stuart, Fort Worth, TX (US); Steven G. Hagerott, Wichita, KS (US)

(73) Assignee: Textron Innovations Inc., Providence, RI (US)

(*) Notice: Subject to any disclaimer, the term of this patent is extended or adjusted under 35 U.S.C. 154(b) by 315 days.

(21) Appl. No.: 17/338,236

(22) Filed: Jun. 3, 2021

(65) Prior Publication Data

US 2022/0388672 A1 Dec. 8, 2022

(51) Int. Cl.
*B64D 31/00* (2006.01)
*B64C 27/635* (2006.01)
*B64C 27/68* (2006.01)
*B64C 39/02* (2023.01)
*B64D 27/24* (2006.01)
*B64U 30/20* (2023.01)
*B64U 50/19* (2023.01)

(52) U.S. Cl.
CPC .......... *B64D 31/00* (2013.01); *B64C 27/635* (2013.01); *B64C 27/68* (2013.01); *B64C 39/024* (2013.01); *B64D 27/24* (2013.01); *B64U 30/20* (2023.01); *B64U 50/19* (2023.01); *B64U 2201/00* (2023.01)

(58) Field of Classification Search
CPC ........ B64D 31/00; B64D 27/24; B64D 31/14; B64C 27/635; B64C 27/68; B64C 39/024; B64C 29/0033; B64U 30/20; B64U 50/19; B64U 2201/00; B64U 2201/20; B64U 10/20; B64U 50/30; Y02T 50/60
See application file for complete search history.

(56) References Cited

U.S. PATENT DOCUMENTS

2012/0078446 A1* 3/2012 Cameron ................. G05B 6/02
701/3
2018/0231986 A1* 8/2018 White ................... B64D 39/06
(Continued)

FOREIGN PATENT DOCUMENTS

EP            3670348 A1 *  6/2020 ............. B60L 50/00
WO    WO-2020240567 A1 * 12/2020

*Primary Examiner* — Anne Marie Antonucci
*Assistant Examiner* — Connor L Knight
(74) *Attorney, Agent, or Firm* — Akona IP PC

(57) ABSTRACT

A system can include a flight controller for an aircraft that includes an electric motor that drives blades with a variable pitch, where the flight controller receives a command to change a flight characteristic of the aircraft and creates a torque command and a revolutions per minute (RPM) command. The system can also include a propulsion assembly, where the propulsion assembly creates a current command based at least in part on the torque command and the RPM command, creates a blade pitch command based at least in part on the torque command and the RPM command, communicates the current command to the electric motor to change a mechanical output of the electric motor, and communicates the blade pitch command to blade actuators to control the pitch of the blades. The current command and the blade pitch command cause the blades of the aircraft to rotate at a predetermined RPM.

12 Claims, 7 Drawing Sheets

(56) References Cited

U.S. PATENT DOCUMENTS

| | | | |
|---|---|---|---|
| 2019/0291856 A1* | 9/2019 | Kaufman | B64C 27/12 |
| 2021/0001974 A1* | 1/2021 | Kunii | B64U 30/20 |
| 2021/0276693 A1* | 9/2021 | de Magalhães Gomes | B64D 27/24 |
| 2023/0026233 A1* | 1/2023 | Kang | B64D 27/24 |

* cited by examiner

PROPULSION ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

An electric motor is an electrical machine that converts electrical energy into mechanical energy. Most electric motors operate through the interaction between the motor's magnetic field and an electric current in a wire winding to generate force in the form of torque applied on the motor's shaft. An electric aircraft is an aircraft powered by electric motors. The electric motors drive thrust-generating propellers or lift-generating rotors. Electricity may be supplied by a variety of methods including batteries, ground power cables, solar cells, ultracapacitors, fuel cells and power beaming.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Figure 1:
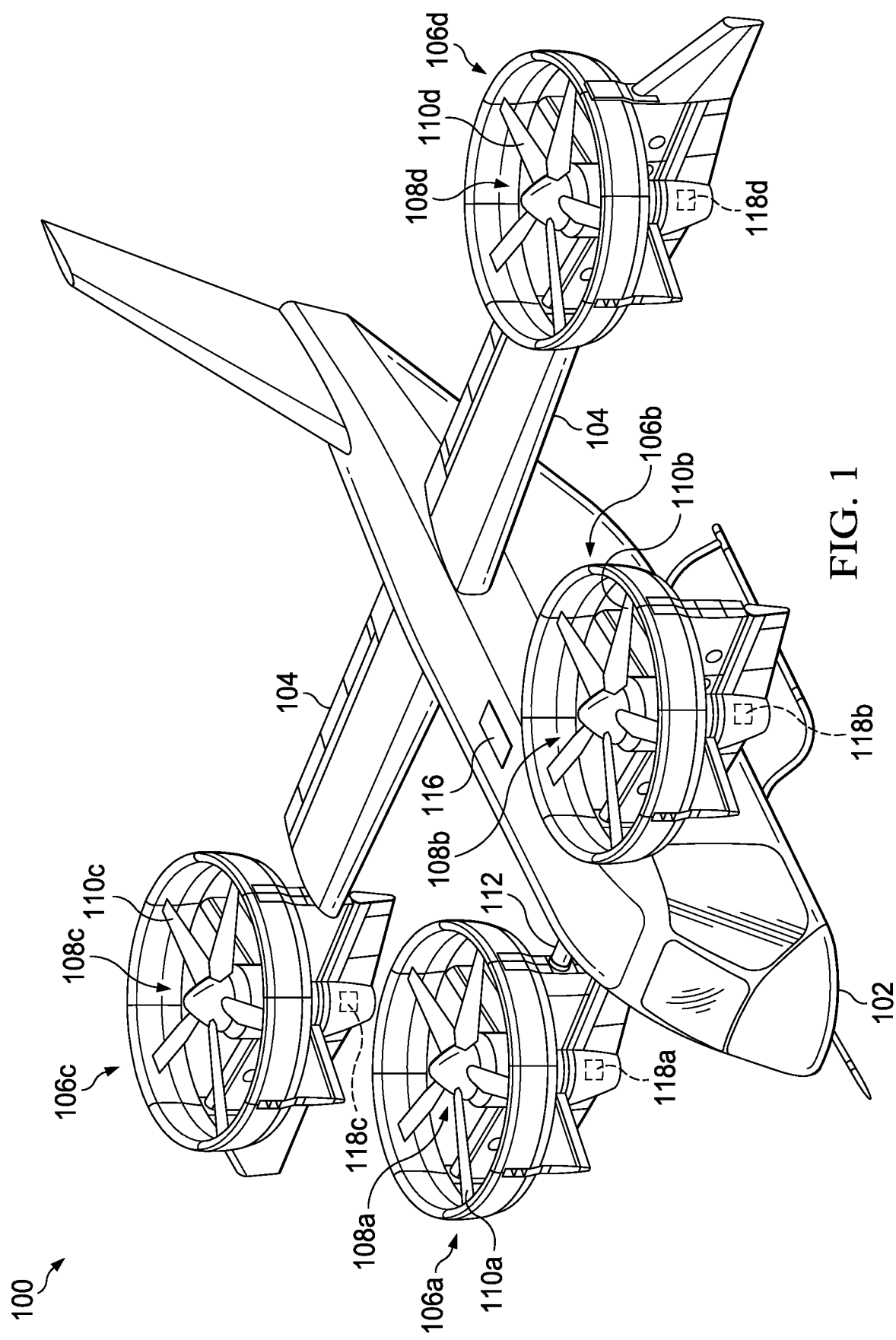
FIG. 1 is an oblique view of an aircraft configured for the aircraft to operate in a helicopter mode with a propulsion assembly, in accordance with an embodiment of the present disclosure.

The following disclosure sets forth examples of apparatuses, methods, and systems relating to a propulsion assembly in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

The terms "over," "under," "below," "between," and "on" as used herein refer to a relative position of one layer or component with respect to other layers or components. For example, one layer or component disposed over or under another layer or component may be directly in contact with the other layer or component or may have one or more intervening layers or components. Moreover, one layer or component disposed between two layers or components may be directly in contact with the two layers or components or may have one or more intervening layers or components. In contrast, a first layer or first component "directly on" a second layer or second component is in direct contact with that second layer or second component. Similarly, unless explicitly stated otherwise, one feature disposed between two features may be in direct contact with the adjacent features or may have one or more intervening layers.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" includes a plus or minus fifteen percent (±15%) variation.

Figure 2:
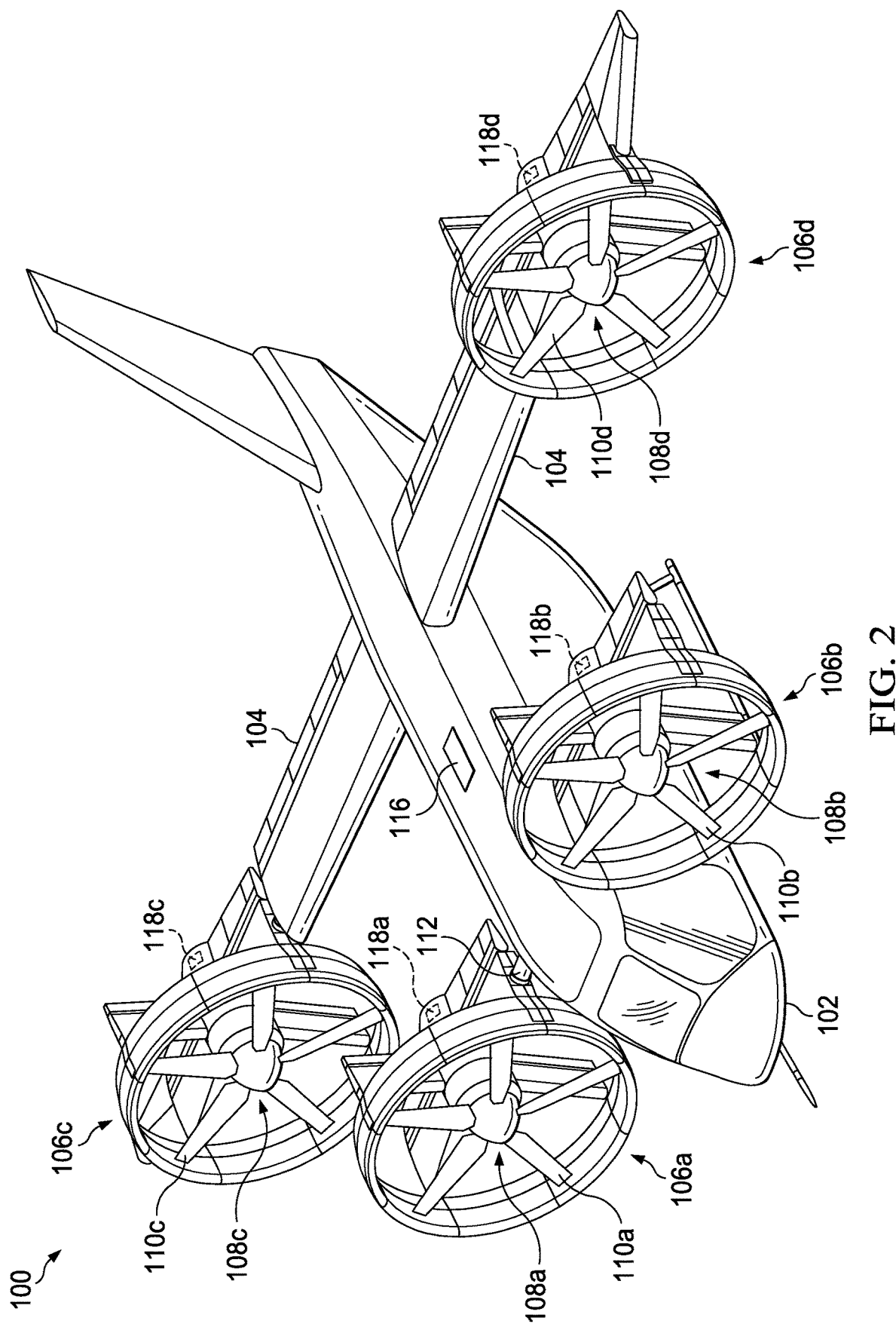
FIG. 2 is an oblique view of an aircraft configured for the aircraft to operate in an airplane mode with a propulsion assembly, in accordance with an embodiment of the present disclosure.

FIGS. 1 and 2 are oblique views of an aircraft 100 configured to allow aircraft 100 to operate in a helicopter mode with a propulsion assembly. Aircraft 100 comprises a fuselage 102, a fixed wing 104, a plurality of propulsion assemblies 106, spindle 112, a flight controller 116, and a plurality of thrust and RPM controllers 118. Each of the plurality of propulsion assemblies 106 can include a motor torque controller, a motor, and a propeller. The propeller can include blades with a variable pitch and blade actuators to control the pitch of the blades.

More specifically, as illustrated in FIGS. 1 and 2, aircraft 100 includes propulsion assemblies 106a-106d. Propulsion assembly 106a includes a propeller 108a and a thrust and RPM controller 118a. Propeller 108a can include blades 110a. Propulsion assembly 106b includes a propeller 108b and a thrust and RPM controller 118b. Propeller 108b can include blades 110b. Propulsion assembly 106c includes a propeller 108c and a thrust and RPM controller 118c. Propeller 108c can include blades 110c. Propulsion assembly 106d includes a propeller 108d and a thrust and RPM controller 118d. Propeller 108d can include blades 110d.

In an example, each of the plurality of propulsion assemblies 106 is associated with a corresponding thrust and RPM controller 118. More specifically, thrust and RPM controller 118a is associated with and controls propulsion assembly 106a, thrust and RPM controller 118b is associated with and controls propulsion assembly 106b, thrust and RPM controller 118c is associated with and controls propulsion assembly 106c, and thrust and RPM controller 118d is associated with and controls propulsion assembly 106d.

The position and the pitch of blades 110a-110d can be selectively controlled to control direction, thrust, and lift of aircraft 100. In addition, each of propulsion assemblies 106a-106d can be repositionable (e.g., rotated using spindle 112) to convert aircraft 100 between a helicopter mode and an airplane mode. As shown in FIG. 1, each of propulsion assemblies 106a-106d are positioned such that aircraft 100 is in helicopter mode, which allows for vertical takeoff and landing, hovering, and low-speed directional movement. As shown in FIG. 2, each of propulsion assemblies 106a-106d are positioned such that aircraft 100 is in airplane mode, which allows for high-speed forward-flight.

In this embodiment, aircraft 100 is configured with four electric engines (e.g., each of propulsion assemblies 106a-106d includes an electric engine). However, it should be appreciated that aircraft 100 is not limited to the illustrated configuration having four electric engines and/or four propulsion assemblies 106a-106d and that aircraft 100 may alternatively be implemented with more or fewer than four electric engines and/or propulsion assemblies 106a-106d.

In an example, flight controller 116 and thrust and RPM controller 118 can be configured to control the thrust of aircraft 100 by commanding motor torque and holding the revolutions per minute (RPM) of the blades to a desired RPM using collective blade pitch. The desired RPM is a predetermined RPM value that is within a specific tolerance, a specific RPM range, or about a specific RPM. The desired RPM is aircraft and flight condition dependent. For example, a tilt rotor aircraft in hover flight condition may have a desired RPM that is set or determined by a desired rotor tip speed that will allow the aircraft to stay in the hover flight condition. The tilt rotor aircraft in an airplane flight condition will have a desired RPM that is less than the desired RPM when the tilt rotor aircraft is in the hover flight condition for cruise efficiency. Flight controller 116 can receive inputs directly from the upstream control commands and there are no delays (or relatively minimal delays) on individual cross-feed paths because the output and commands on these paths are done all by flight controller 116.

In a specific illustrative example, a motor torque command must travel from flight controller 116 to a thrust controller (e.g., thrust and RPM controller 118a) and there is a delay that is about equal to about one frame or one cycle interval, one data/calculation cycle of the thrust controller, or about 1/500 of a second. For a collective blade pitch command, there is also a flight controller frame delay equal to about one frame or one cycle interval, one data/calculation cycle of the thrust controller, or about 1/500 of a second. There is also a collective blade pitch delay added because the collective blade pitch command must travel from flight controller 116 into the thrust controller. The blade pitch command acts through a collective blade pitch actuator and into blades 110. The resulting torque or difference due to the blade collective pitch change can combine with the motor torque to accelerate or decelerate the angular rotation rate of a shaft that rotates blades 110 to yield a desired RPM. This allows the current command and the blade pitch command to cause the blades to rotate at a predetermined RPM and/or desired RPM.

In an illustrative example, the propellers RPM is in a steady state of nine hundred (900) RPM. In a nominal range of operation, an increase in the torque command (and subsequent motor torque) would affect an increase in the RPMs while an increase in the propeller blade pitch would increase the propeller aerodynamic torque and would result in a decrease in the RPM of the propeller (for a given motor torque). When the motor supplied torque and the aerodynamic load torque from the propeller are relatively equal, the propeller's RPM effectively remains constant. For a given blade pitch setting (in the nominal range), increasing the propeller's RPM will increase the thrust generated by the propeller as well as the aerodynamic load torque. For a given propeller RPM, increasing the propeller blade pitch setting will increase the thrust generated by the propeller as well as the aerodynamic load torque.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to output or a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

Figure 3:
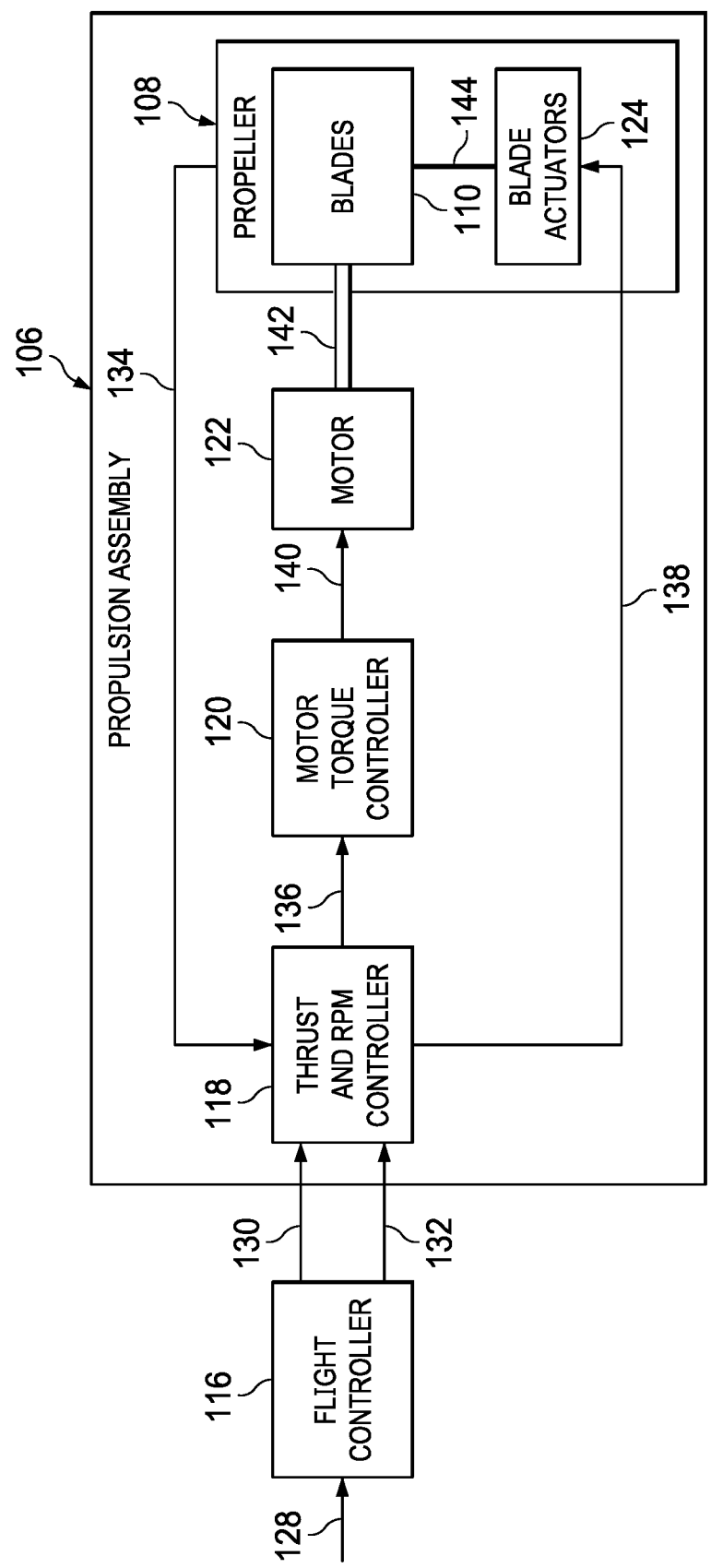
FIG. 3 is a simplified block diagram of a portion of a propulsion assembly, in accordance with an embodiment of the present disclosure.

Turning to FIG. 3, FIG. 3 is a block diagram illustrating examples details of a propulsion assembly 106. As illustrated in FIG. 3, propulsion assembly 106 can include thrust and RPM controller 118, a motor torque controller 120, a motor 122, and a propeller 108. Propeller 108 can include blades 110 with a variable pitch and blade actuators 124 to control the pitch of the blades. In an example, flight controller 116 is configured to receive an input (e.g., a command from a pilot) and direct propulsion assembly 106 in response to the input. Flight controller 116 is basically the nervous system of aircraft 100 and receives information from the pilot and acts on the information by communicating with each propulsion assembly 106 in aircraft 100 to execute the requested movement that will produce the desired outcome.

In an illustrative example, flight controller 116 receives a command 128. Command 128 may be a command from a pilot in aircraft 100, a command from a remote pilot if aircraft 100 is a drone, or some other command. Flight controller 116 can process command 128 and determine how propulsion assembly 106 in aircraft 100 should be configured to cause command 128 to be executed. For example, flight controller 116 can process command 128 and communicate a torque command 130 and RPM command 132 to thrust and RPM controller 118. In some examples, thrust and RPM controller 118 can also receive an RPM value 134. RPM value 134 represents a current RPM reading or determined current RPM measurement of blades 110.

Thrust and RPM controller 118 can receive torque command 130, RPM command 132, and RPM value 134 and generate a motor torque command 136 and a blade pitch command 138. Motor torque command 136 is communicated to motor torque controller 120 from thrust and RPM controller 118. Motor torque controller 120 receives motor torque command 136 and uses motor torque command 136 to determine the amount of current 140 to supply to motor 122 to change the mechanical output of electric motor 122. Current 140 causes motor 122 to apply a torque to shaft 142 to drive shaft 142 and cause blades 110 to rotate. Blade pitch command 138 is communicated from thrust and RPM controller 118 to blade actuators 124 in propeller 108. Blade actuators 124 use blade pitch command 138 to set or help determine the pitch of blades 110. The pitch of blades 110 determines the angle or "bite" of blades 110 as they rotate. RPM value 134 is determined and communicated back to thrust and RPM controller 118. This helps to allow flight controller 116 and thrust and RPM controller 118 to control the thrust of aircraft 100 using motor torque while holding the RPM of blades to a desired RPM by using the collective blade pitch.

In some current electric motor systems, the motor control is through the control of only the RPM of the motor (or shaft or blades if present). However, this can be problematic when collective control (e.g., controlling the pitch of the rotor blades) is added to the system and can slow down the response of the system. More specifically, it can be difficult for a motor to maintain the RPM of blades while the system varies the collective pitch on the rotor for more rapid thrust control. This is because the system needs to know what the rotor characteristics were (and there are several) so the system can determine what kind of thrust to power consumption is needed with a change of collective that can then be feed back to the motor control to maintain the needed RPM.

In a specific example of aircraft control, a user may be trying to hoover and control the craft. The system can be maintaining a constant or desired RPM but the user may want to increase the thrust. To increase the thrust, the user would change the rotor collective and give the blade more bite. However, the torque from the blade having more bite can react back onto the motor shaft and slow down the RPM of the blades and create an RPM drop. The drop in RPM works against trying to add the thrust. The motor controller senses the RPM drop after it happens and then applies more current to the motor to increase the torque and bring the RPM of the blades back up and that creates a lag in the system. If a feed forward is introduced into the system to increase the RPM of the blades in preparation of the torque drop, the system would need to have some knowledge of what the torque increase would be due to the collective change and that would need to be mapped across a flight envelope which can be difficult.

In an example, to make an aircraft more responsive, instead of trying to use the electric motor control to control the RPM, thrust and RPM controller 118 can give the motor more current and let the motor provide more torque and the thrust and RPM controller can control the RPM of the blades by using the collective blade pitch. To gain more power, the system can command more torque (torque times RPM equals power), so the system knows how much thrust will be created with the power change. Thrust and RPM controller 118 can apply power by changing the motor torque command 136 and maintain the RPM of the blades by controlling the collective pitch using blade pitch command 138. For example, when the system adds more torque, the system tends to want to rotate the blades faster and once that happens, the thrust immediately increases and then the collective controller increases the collective bite to add reactionary torque and hold the RPM back. This process increases the bandwidth from a thrust controller standpoint because the thrust is immediately given instead of asking for the thrust and having a lag that hurts the bandwidth of the controller. In this case, the system can command more torque and the motor gives more torque and immediately or relatively immediately or more quickly (as compared to current processes) provides the desired change in thrust.

The term "bandwidth" includes the difference between the upper and lower frequencies in a continuous band of frequencies and includes the frequency range (generally starting at zero (0) db for zero frequency) over which the closed-loop response magnitude does not drop below −3 db. More specifically, the bandwidth refers to the frequency range in which the signal's spectral density (in W/Hz or $V^2$/Hz) is nonzero or above a threshold value. The threshold value is often defined relative to the maximum value, and is most commonly the half power point, half power bandwidth, or 3 dB point. The half-power point or half-power bandwidth is the point where the output power has dropped to half of its peak value; that is, at a level of approximately −3 dB and that is the point where the spectral density is half its maximum value. In general, increases in bandwidth imply faster response capability. Increased bandwidth can also imply increased crossover frequency and improved stability margins.

In some examples, thrust and RPM controller 118 is designed to hold/maintain the motor and propeller system at a constant RPM while allowing thrust to be varied in response to the input torque command. When the motor torque is higher than the propeller aerodynamic load torque, the RPM will increase until the propeller aerodynamic load torque is equal to the motor torque. When the motor torque is less than the propeller aerodynamic load torque, the RPM will decrease until a balance results. This balance actually takes place on the shaft connecting the motor and the propeller. Thrust and RPM controller 118 varies the collective blade pitch in an RPM feedback loop (e.g., using RPM governor proportional integral derivative controller 152) that increases blade pitch by commanding the blade pitch actuator(s) in response to an increase in RPM following an increase in the torque commanded and delivered by the motor. The increase in blade pitch increases the propeller thrust as well as the propeller aerodynamic load torque to change the RPM in the direction of the controlled value. Similarly, a decrease in torque command (and subsequent motor torque) causes the RPM to be reduced at which point the system (e.g., using RPM governor proportional integral derivative controller 152), responding to the RPM change, reduces the blade pitch command, resulting in a reduction in blade pitch that reduces the propeller thrust and the aerodynamic load torque to maintain RPM. In this way, the system continuously increases and decreases the propeller blade pitch, in response to variations in RPM, to maintain the RPM as close as possible to or at about a pre-determined RPM or RPM range or desired RPM or RPM range.

Figure 4:
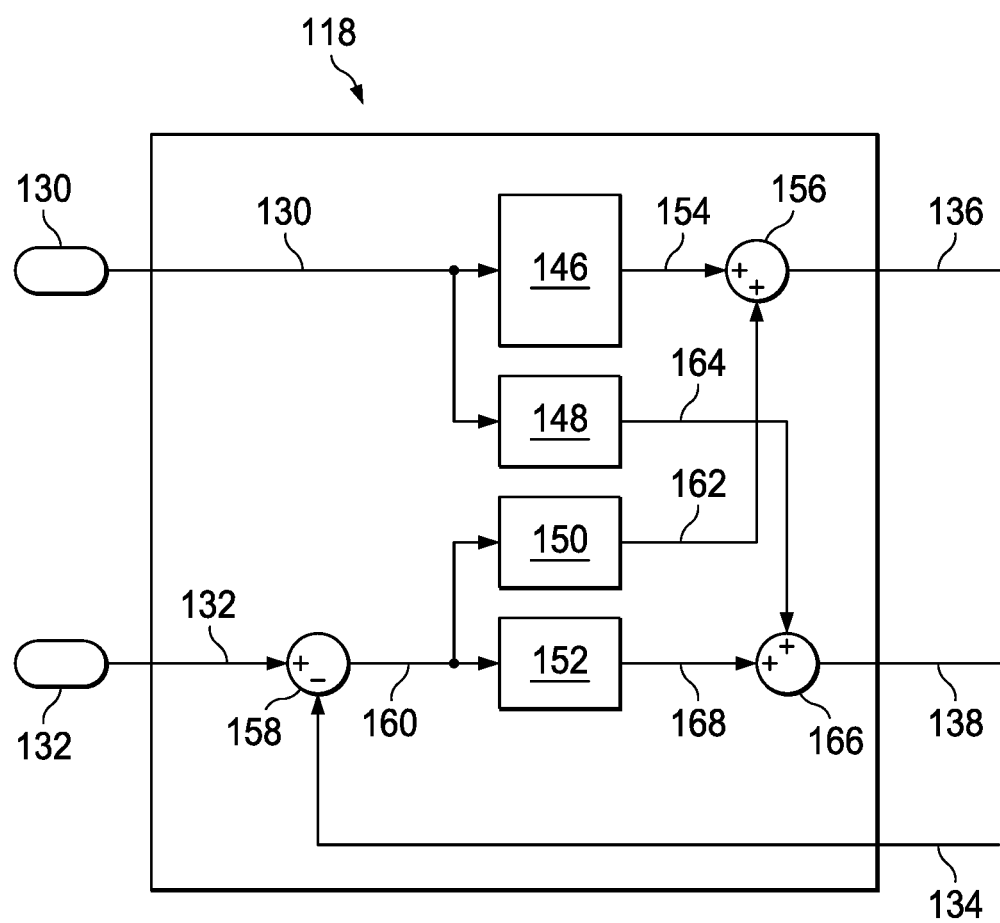
FIG. 4 is a simplified block diagram of a portion of a propulsion assembly, in accordance with an embodiment of the present disclosure.

Turning to FIG. 4, FIG. 4 is a block diagram illustrating examples details of a portion of a propulsion assembly. As illustrated in FIG. 4, thrust and RPM controller 118 can include a lead/lag filter 146, a torque to collective blade pitch lead module 148, a torque proportional derivate module 150, an RPM governor proportional integral derivative controller 152, a first combiner 156, an RPM difference determiner 158, and a second combiner 166. Thrust and RPM controller 118 can receive torque command 130 and RPM command 132 (e.g., from flight controller 116). In addition, thrust and RPM controller 118 can receive RPM value 134 (e.g., from propeller 108).

More specifically, lead/lag filter 146 in thrust and RPM controller 118 can receive flight controller torque command 130. Lead/lag filter 146 applies forward path shaping to torque command 130 to tailor the bandwidth and crossover frequency of torque command 130 and create shaped forward path torque command 154. Shaped forward path torque command 154 is communicated to first combiner 156. In an example, lead/lag filter 146 is a dynamic component (transfer function) that can apply a combination of lead or lag to the input signal flight controller torque command 130. Lead/lag filter coefficients are selected to improve response by adding gain and phase lead for frequencies above zero (dc) while maintaining zero gain in the steady state.

Torque to collective blade pitch lead module 148 in thrust and RPM controller 118 can also receive torque command 130. Torque to collective blade pitch lead module 148 can receive torque command 130, apply or add an anticipatory correction to torque command 130, and create torque to blade pitch command 164. More specifically, torque to collective blade pitch lead module 148 can receive torque command 130, apply a correction based on the change of torque that torque command 130 will cause, a correction based on the rapidness or abruptness of the change in torque that torque command 130 will cause, and create torque to blade pitch command 164. Torque to blade pitch command 164 is communicated to second combiner 166.

In some examples, torque to collective blade pitch lead module 148 applies an anticipatory component from the torque command to the blade pitch command adding phase lead and increasing the bandwidth and gain crossover frequency of thrust and RPM controller 118. If the torque command increases, it is known that the propeller blade pitch will be increased by RPM governor proportional integral derivative controller 152 to compensate for the RPM increase that will occur with the increase in applied torque. However, this action incurs a delay because RPM governor proportional integral derivative controller 152 acts on RPM error only as it develops. RPM governor proportional integral derivative controller 152 responds to RPM differences (RPM error) that occur following changes in system torque. RPM error lags changes in torque in inverse proportion to the rotational inertia of the motor plus propeller system (e.g., more inertia, more lag). Torque to collective blade pitch lead module 148 can act in anticipation of the expected RPM increase by adding a change (in this case an increase) to blade pitch command 138.

Figure 5:
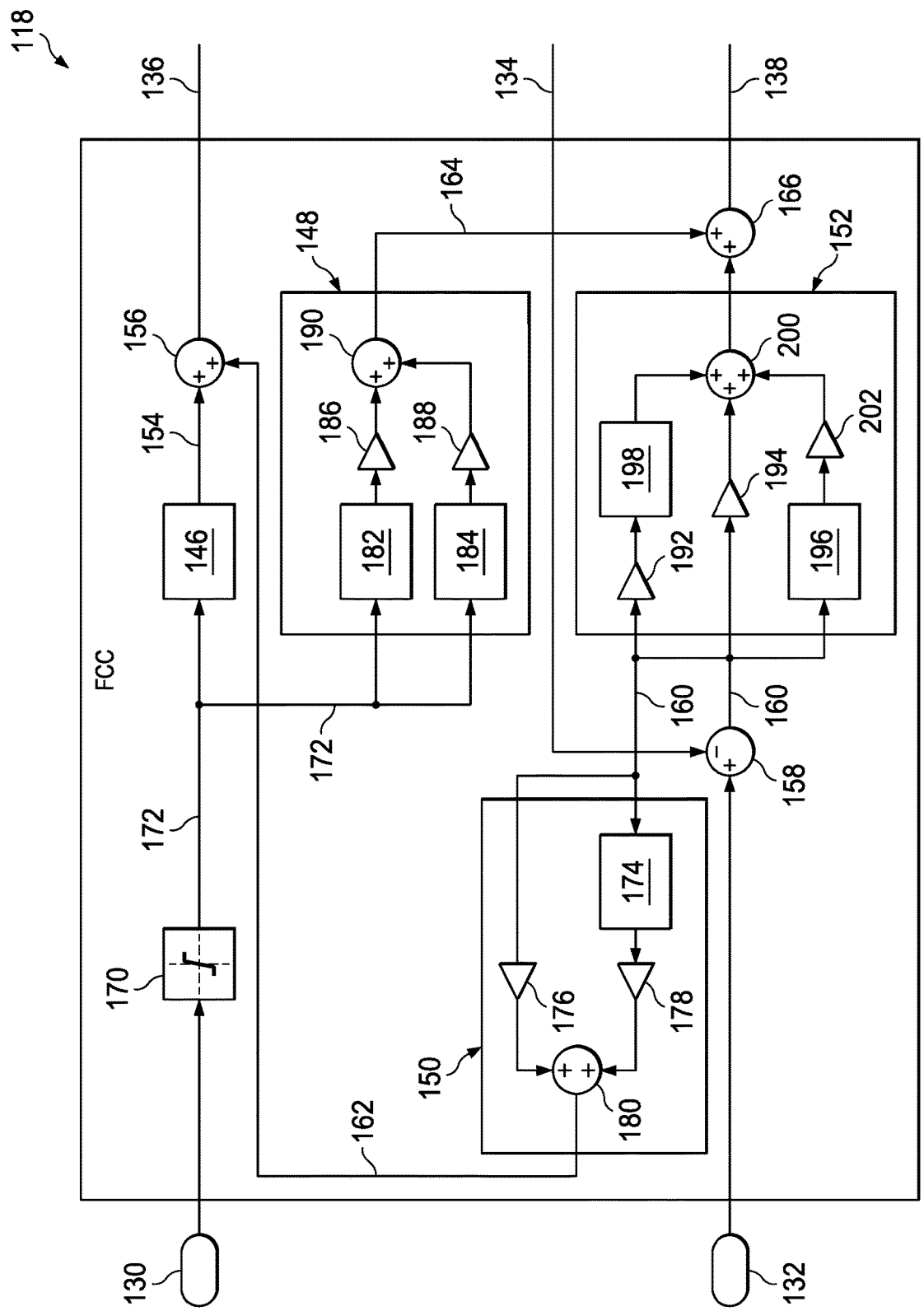
FIG. 5 is a simplified block diagram of a portion of a propulsion assembly, in accordance with an embodiment of the present disclosure.

Torque to collective blade pitch lead module 148 can utilize a wash-out path (high pass filter) and a derivative path from the torque command and combine the responses, as weighted per their attendant gains (e.g., a first torque command to blade pitch gain 186 shown in FIG. 5 and a second torque command to blade pitch gain 188 shown in FIG. 5, respectively), by addition (e.g., using a torque command to blade pitch combiner 190 shown in FIG. 5) to create torque to blade pitch command 164. Torque to blade pitch command 164 can be added to the output of RPM governor proportional integral derivative controller 152 (e.g., using a torque command to blade pitch combiner 190 shown in FIG. 5) to form blade pitch command 138.

RPM command 132 can be received by RPM difference determiner 158. In addition, RPM difference determiner 158 receives RPM value 134. RPM difference determiner 158 subtracts RPM value 134 from RPM command 132 to create an RPM difference value 160. RPM difference value 160 is communicated to RPM error to torque proportional derivative module 150 and RPM governor proportional integral derivative controller 152.

RPM error to torque proportional derivative module 150 can receive RPM difference value 160. RPM error to torque proportional derivative module 150 can modify RPM difference value 160 and generate a proportional plus derivative response to the RPM error (or difference between RPM value 134 and RPM command 132) and create RPM error to torque command feed forward signal 162. In a specific example, RPM error to torque proportional derivative module 150 can modify RPM difference value 160 to increase the controller's bandwidth by adding an adjustment to RPM difference value 160. RPM error to torque proportional derivative module 150 can help improve system bandwidth and tracking by generating an anticipatory feed-forward signal (e.g., RPM error to torque command feed forward signal 162) that is added to torque command 130. RPM error to torque command feed forward signal 162 is a feed forward of RPM error to torque and is communicated to first combiner 156. First combiner 156 combines shaped forward path torque command 154 and RPM error to torque command feed forward signal 162 to create motor torque command 136. Motor torque command 136 is communicated to motor torque controller 120, as illustrated in FIG. 3.

RPM governor proportional integral derivative controller 152 can receive RPM difference value 160. RPM governor proportional integral derivative controller 152 is the primary control for the RPM governing action and can be a proportional integral derivative controller operating on the collective blade pitch to control the RPM of the blades (as opposed to the other controllers that perform secondary shaping). RPM governor proportional integral derivative controller 152 can receive RPM difference value 160 (the difference between a desired RPM and the measured RPM) and apply proportional, integral, and derivative actions and create RPM governor blade pitch command 168. RPM governor blade pitch command 168 is communicated to second combiner 166. Second combiner 166 combines torque to blade pitch command 164 and RPM governor blade pitch command 168 to create blade pitch command 138. Blade pitch command 138 is communicated to blade actuators 124 in propeller 108, as illustrated in FIG. 3.

Turning to FIG. 5, FIG. 5 is a block diagram illustrating examples details of a portion of a propulsion assembly. As illustrated in FIG. 5, thrust and RPM controller 118 can include lead/lag filter 146, torque to blade pitch lead module 148, RPM error to torque proportional derivative module 150, RPM governor proportional integral derivative controller 152, first combiner 156, RPM difference determiner 158, second combiner 166, and torque command limiter 170. Torque to blade pitch lead module 148 can include a torque command to blade pitch washout filter module 182, a torque command to blade pitch filtered derivative module 184, a first torque command to blade pitch gain 186, a second torque command to blade pitch gain 188, and a torque command to blade pitch combiner 190. RPM error to torque proportional derivative module 150 can include an RPM error to torque filtered derivative module 174, a first RPM error to torque proportional gain 176, a second RPM error to torque derivative gain 178, and an RPM error to torque combiner 180. RPM governor proportional integral derivative controller 152 can include an RPM governor integral gain 192, an RPM governor proportional gain 194, an RPM governor filtered derivative module 196, an RPM governor integration module 198, an RPM governor combiner 200, and an RPM governor derivative gain 202.

Thrust and RPM controller 118 can receive torque command 130 and RPM command 132 (e.g., from flight controller 116). In addition, thrust and RPM controller 118 can receive RPM value 134 (e.g., a measurement of the RPM of blades 110 from propeller 108). More specifically, torque command limiter 170 can receive torque command 130 and limit the torque value to ensure that the torque value falls within a useable range for the controller and motor. Torque command limiter 170 can create limited torque command 172. Limited torque command 172 is communicated to lead/lag filter 146. Lead/lag filter 146 is a lead/lag transfer function that can be used to tailor and shape limited torque command 172 and create forward path torque command 154. Forward path torque command 154 is communicated to first combiner 156.

Torque to blade pitch lead module 148 can also receive limited torque command 172. More specifically, torque command to blade pitch washout filter module 182 and torque command to blade pitch filtered derivative module 184 in torque to blade pitch lead module 148 can receive limited torque command 172. Both blade pitch washout filter module 182 and filtered derivative 184 respond only to changes in limited torque command 172. Blade pitch washout filter module 182 can be a first order high pass filter that responds to changes in limited torque command 172 but has zero static gain, attenuating frequencies below the its cutoff frequency while passing the frequency content of limited torque command 172 above its cutoff frequency. Filtered derivative 184 can respond to the rate of change of limited torque command 172, initiating an immediate result, but attenuate unwanted higher frequencies that could contribute to system noise.

Torque command to blade pitch washout filter module 182 can receive limited torque command 172 and break limited torque command 172 into individual branches where a washout portion (e.g., a high-pass filter) adds leads at a desired frequency and a derivative adds leads for all non-zero frequencies. Torque command to blade pitch washout filter module 182 can communicate the output to first torque command to blade pitch gain 186. First torque command to blade pitch gain 186 can increase the power or amplitude of the output of torque command to blade pitch washout filter module 182 and communicate the output to torque command to blade pitch combiner 190. Torque command to blade pitch filtered derivative module 184 can receive limited torque command 172 and differentiate limited torque command 172. In some examples, torque command to blade pitch filtered derivative module 184 takes a time derivative of limited torque command 172 and filters the derivative because derivatives can be inherently noisy. The differentiated limited torque command 172 is communicated to second torque command to blade pitch gain 188. Second torque command to blade pitch gain 188 can increase the power or amplitude of the output of torque command to blade pitch filtered derivative module 184 and communicate the output to torque command to blade pitch combiner 190. Torque command to blade pitch combiner 190 can combine the output of torque command to blade pitch washout filter module 182 and torque command to blade pitch filtered derivative module 184 to create torque to blade pitch command 164. Torque to blade pitch command 164 is communicated to second combiner 166.

RPM command 132 can be received by RPM difference determiner 158. In addition, RPM difference determiner 158 receives RPM value 134. RPM difference determiner 158 subtracts RPM value 134 from RPM command 132 to create an RPM difference value 160. RPM difference value 160 is communicated to RPM error to torque proportional derivative module 150 and RPM governor proportional integral derivative controller 152.

More specifically, first RPM error to torque proportional gain 176 in RPM error to torque proportional derivative module 150 can receive RPM difference value 160, increase the power or amplitude of RPM difference value 160, and communicate the output to RPM error to torque combiner 180. RPM error to torque proportional derivative module 150 can receive RPM difference value 160 and apply proportional plus derivative action to the RPM error signal as a feed forward to the torque command and allow the torque command to operate in sympathy with the RPM controller. In addition, RPM error to torque filtered derivative module 174 in RPM error to torque proportional derivative module 150 can receive RPM difference value 160. RPM error to torque filtered derivative module 174 can receive RPM difference value 160 and apply derivative action to the RPM error signal. The output from RPM error to torque filtered derivative module 174 can be communicated to second RPM error to torque derivative gain 178. Second RPM error to torque derivative gain 178 can increase the power or amplitude of the output of RPM error to torque filtered derivative module 174 and communicate the output to RPM error to torque combiner 180. RPM error to torque combiner 180 can combine the output of first RPM error to torque proportional gain 176 and second RPM error to torque derivative gain 178 to create RPM error to torque command feed forward signal 162. RPM error to torque command feed forward signal 162 is communicated to first combiner 156. First combiner 156 combines shaped forward path torque command 154 and RPM error to torque command feed forward signal 162 to create motor torque command 136. Motor torque command 136 is communicated to motor torque controller 120, as illustrated in FIG. 3.

In an example, RPM error to torque command feed forward signal 162 is generated in RPM error to torque proportional derivative module 150 by proportional (e.g., first RPM error to torque proportional gain 176) and derivative action (e.g., by RPM error to torque filtered derivative module 174 and second RPM error to torque derivative gain 178) on the system RPM error (e.g., RPM difference value 160). If the RPM value falls below RPM command 132, an increase in motor torque command 136, and subsequent motor torque, will act to increase the system RPM (e.g., the RPM of blades 110). RPM error to torque command feed forward signal 162 is generated by RPM error to torque proportional derivative module 150 as immediate action to modify the torque command to reduce the RPM error (e.g., RPM difference value 160). If the RPM value 134 changes relative to RPM command 132, an RPM error (e.g., RPM difference value 160) results. RPM error to torque filtered derivative module 174 generates an output equal to the rate of change of the RPM error (e.g., RPM difference value 160) that is multiplied (scaled) by gain (e.g., from second RPM error to torque derivative gain 178). The RPM error (e.g., RPM difference value 160) is multiplied by the proportional path gain (e.g., from first RPM error to torque proportional gain 176). These results are summed in RPM error to torque combiner 180 and output as RPM error to torque command feed forward signal 162.

RPM governor integral gain 192 in RPM governor proportional integral derivative controller 152 can also receive RPM difference value 160, increase the power or amplitude of RPM difference value 160, and communicate the output to RPM governor integration module 198. RPM governor integration module 198 integrates the output from RPM governor integral gain 192 and communicates the output to RPM governor combiner 200. In addition, second RPM governor gain 194 in RPM governor proportional integral derivative controller 152 can receive RPM difference value 160, increase the power or amplitude of RPM difference value 160, and communicate the output to RPM governor differentiator 200. Further, RPM governor filtered derivative module 196 can receive RPM difference value 160, take the time derivative of RPM difference value 160 (dU/dt), and communicate the output to RPM governor derivative gain 202. RPM governor derivative gain 202 increases the power or amplitude of the output from RPM governor filtered derivative module 196 and communicates the output to RPM governor combiner 200. RPM governor combiner 200 combines the proportional integral derivative (PID) control signals and can receive the signal from RPM governor integration module 198, the signal from RPM governor proportional gain 194, and the signal from RPM governor derivative gain 202 and sum the components to create RPM governor blade pitch command 168. RPM governor blade pitch command 168 is communicated to second combiner 166. Second combiner 166 combines torque to blade pitch command 164 and RPM governor blade pitch command 168 to create blade pitch command 138. Blade pitch command 138 is communicated to blade actuators 124 in propeller 108, as illustrated in FIG. 3. In an example, RPM governor proportional integral derivative controller 152 provides PID action to control the output and help reduce the input error with respect to RPM difference value 160. More specifically, RPM governor proportional gain 194 gives an output (the "P" of PID) when an error is present (e.g., not zero), RPM governor filtered derivative module 196 and RPM governor derivative gain 202 provides an output (the "D" of PID) only when the error is changing, and RPM governor integral gain 192 and RPM governor integration module 198 provides an output that is the integral term (the "I" of PID) that continuously sums the error to hold an offset such that when the error is zero and not moving, RPM governor proportional integral derivative controller 152 can help keep the RPM of the blades within a desired range or at a desired RPM.

Figure 6:
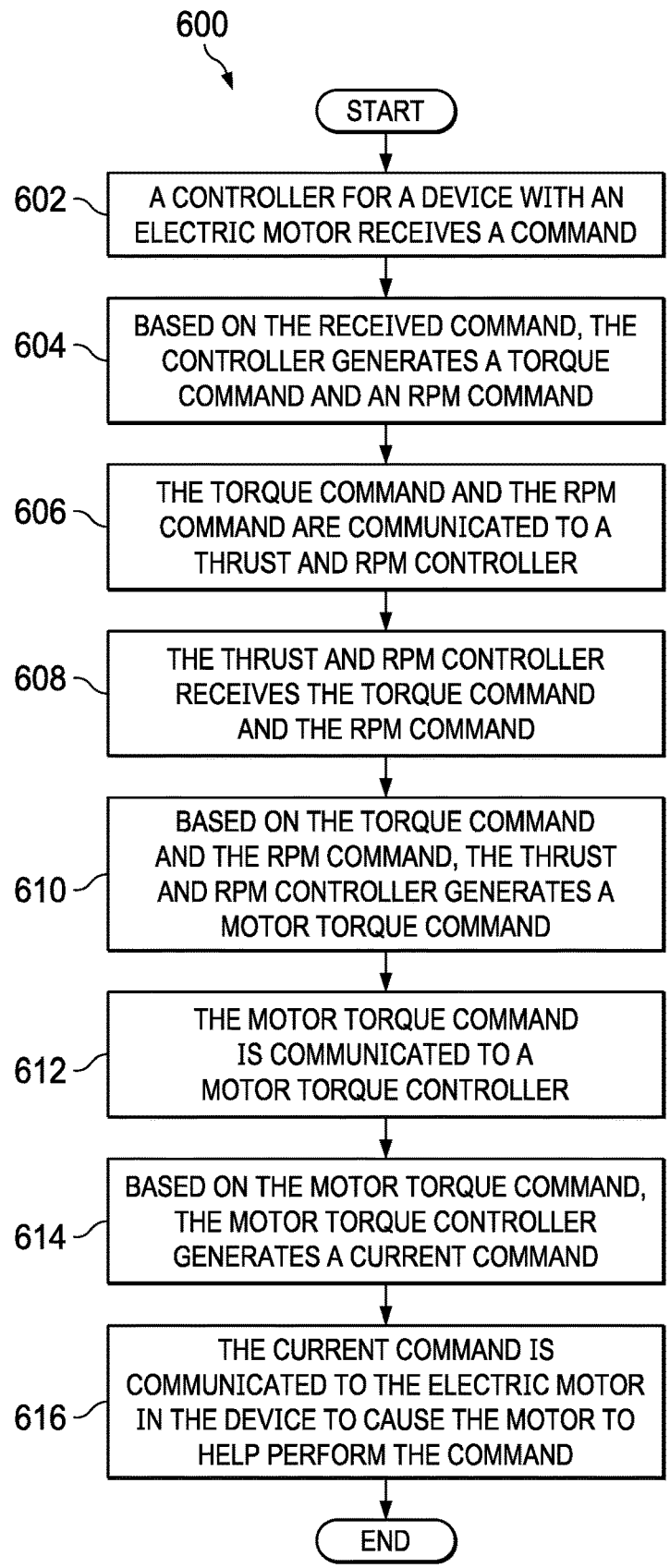
FIG. 6 is flowchart illustrating potential operations that may be associated with the system in accordance with an embodiment.

Turning to FIG. 6, FIG. 6 is an example flowchart illustrating possible operations of a flow 600 that may be associated with enabling a propulsion assembly, in accordance with an embodiment. In an embodiment, one or more operations of flow 600 may be performed by propulsion assembly 106, propeller 108, blades 110, flight controller 116, thrust and RPM controller 118, motor torque controller 120, motor 122, and blade actuators 124. At 602, a controller for a device with an electric motor receives a command. At 604, based on the received command, the controller generates a torque command and an RPM command. At 606, the torque command and the RPM command are communicated to a thrust and RPM controller. At 608, the thrust and RPM controller receives the torque command and the RPM command. At 610, based on the torque command and the RPM command, the thrust and RPM controller generates a motor torque command. At 612, the motor torque command is communicated to a motor torque controller. At 614, based on the motor torque command, the motor torque controller generates a current command for the electric motor. At 616, the current command is communicated to the electric motor in the device to cause the motor to help perform the command.

Figure 7:
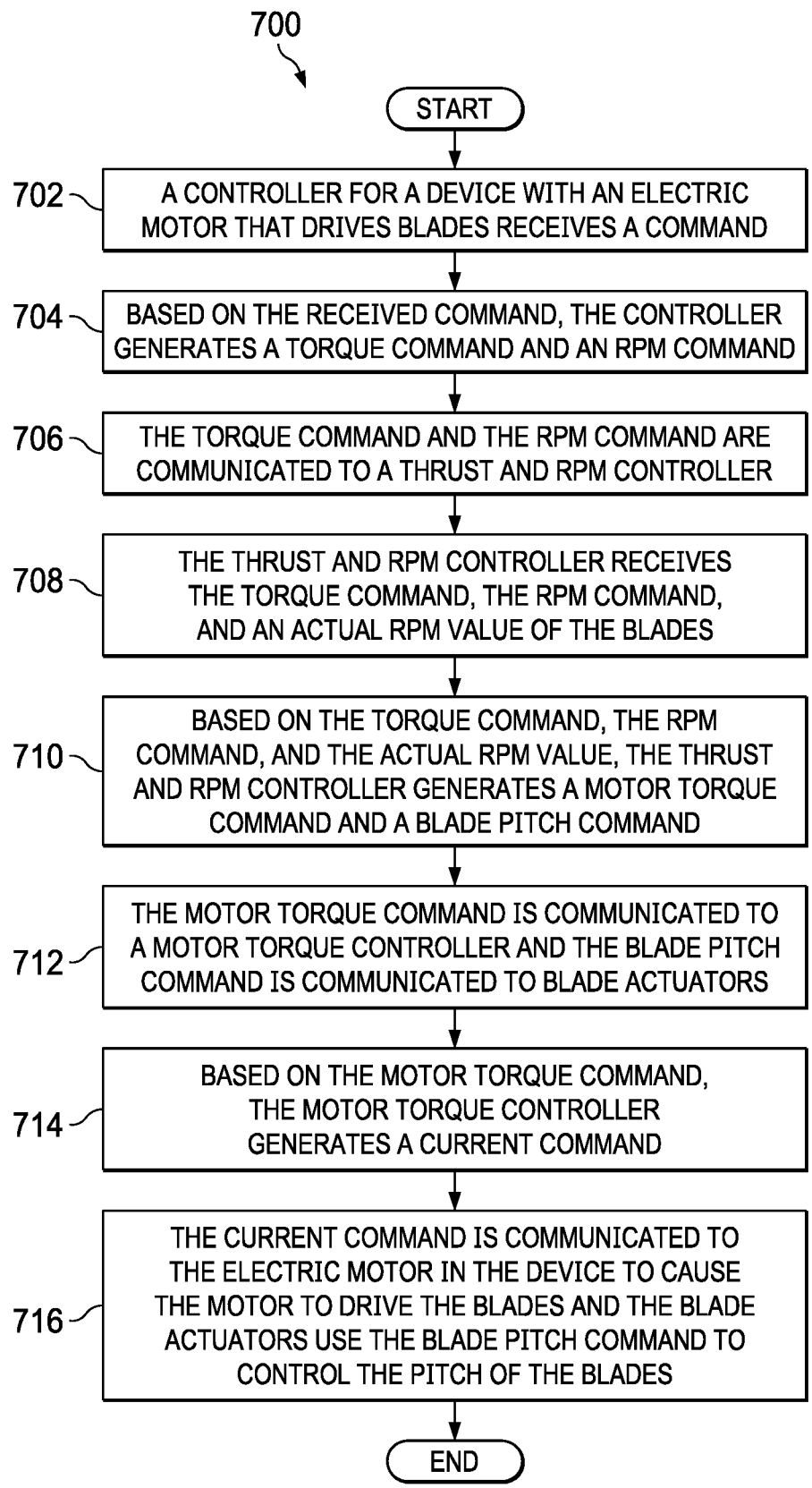
FIG. 7 is flowchart illustrating potential operations that may be associated with the system in accordance with an embodiment.

Turning to FIG. 7, FIG. 7 is an example flowchart illustrating possible operations of a flow 700 that may be associated with enabling a propulsion assembly, in accordance with an embodiment. In an embodiment, one or more operations of flow 700 may be performed by propulsion assembly 106, propeller 108, blades 110, flight controller 116, thrust and RPM controller 118, motor torque controller 120, motor 122, and blade actuators 124. At 702, a controller for a device with an electric motor that drives blades receives a command. At 704, based on the received command, the controller generates a torque command and an RPM command. At 706, the torque command and the RPM command are communicated to a thrust and RPM controller. At 708, the thrust and RPM controller receives the torque command, the RPM command, and an actual RPM value of the RPM of the blades. At 710, based on the torque command, the RPM command, and the actual RPM value, the thrust and RPM controller generates a motor torque command and a blade pitch command. At 712, the motor torque command is communicated to a motor torque controller and the blade pitch command is communicated to blade actuators. At 714, based on the motor torque command, the motor torque controller generates a current command for the electric motor. At 716, the current command is communicated to the electric motor in the device to cause the motor to drive the blades and the blade actuators use the blade pitch command to control the pitch of the blades to help perform the command.

It is important to note that the operations in the preceding flow diagrams (i.e., FIGS. 6 and 7) illustrate only some of the possible correlating scenarios and patterns that may be executed by, or within, propulsion assembly 106, flight controller 116, thrust and RPM controller 118, and motor torque controller 120. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the system in that any suitable arrangements, chronologies, configurations, and timing mechanisms may be provided without departing from the teachings of the present disclosure.

Implementations of the embodiments disclosed herein may be formed or carried out on or over a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

Aircraft 100 may include any suitable hardware, software, components, modules, or objects that facilitate operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal computing structure associated with aircraft 100, aircraft 100 can include memory elements for storing information to be used in operations or functions. Aircraft 100 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in aircraft 100 could be provided in any database, register, queue, table, cache, control list, or other storage structure, all of which can be referenced at any suitable timeframe. Any such storage options may also be included within the broad term 'memory element' as used herein.

In certain example implementations, functions may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for operations. This includes the memory elements being able to store software, logic, code, or processor instructions that are executed to carry out the activities.

Additionally, aircraft 100 may include one or more processors that can execute software or an algorithm to perform activities. A processor can execute any type of instructions associated with the data to achieve one or more operations. In one example, the processors could transform an element or an article (e.g., data) from one state or thing to another state or thing. In another example, activities may be implemented with fixed logic or programmable logic (e.g., software/computer instructions executed by a processor) and aircraft 100 could include some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements and modules described herein should be construed as being encompassed within the broad term 'processor.'

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although flight controller 116 and thrust and RPM controller 118 have been illustrated with reference to particular elements and operations, these elements and operations may be replaced by any suitable architecture, protocols, and/or processes that achieve the intended functionality of propulsion assembly 106 and flight controller 116.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example M1 is a method including receiving a command to change a mechanical output of an electric motor, where the electric motor drives blades with a variable pitch, creating a current command based at least in part on the command to change the mechanical output of the electric motor, creating a blade pitch command based at least in part on the command to change the mechanical output of the electric motor, communicating the current command to the electric motor to change the mechanical output of the electric motor, and communicating the blade pitch command to blade actuators to control the pitch of the blades.

In Example M2, the subject matter of Example M1 can optionally include where the current command and the blade pitch command cause the blades to rotate at a predetermined revolutions per minute (RPM).

In Example M3, the subject matter of any one of the Examples M1-M2 can optionally include determining a current revolutions per minute (RPM) of the blades, where the blade pitch command is at least partially based on the current RPM of the blades.

In Example M4, the subject matter of any one of the Examples M1-M3 can optionally include creating a torque command and a revolutions per minute (RPM) command, where the torque command and the RPM command are at least partially based on the received command to change the mechanical output of the electric motor, where the blade pitch command is at least partially based on the RPM command, creating a motor torque command at least partially based on the torque command, and creating the current command at least partially based on the motor torque command.

In Example M5, the subject matter of any one of the Examples M1-M4 can optionally include where a lead/lag filter receives the torque command and applies forward path shaping to tailor a bandwidth and a crossover frequency of the torque command.

In Example M6, the subject matter of any one of the Examples M1-M5 can optionally include where a torque to collective blade pitch lead module receives the torque command and applies a correction based on a change of torque that the torque command will cause to the electric motor.

In Example M7, the subject matter of any one of the Examples M1-M6 can optionally include determining a current RPM of the blades and subtracting the current RPM of the blades from the RPM command to create an RPM difference value.

In Example M8, the subject matter of any one of the Examples M1-M7 can optionally include where an RPM error to torque proportional derivative module receives the RPM difference value and modifies the RPM difference value to increase a bandwidth of the controller by adding an adjustment to the RPM difference value.

In Example M9, the subject matter of any one of the Examples M1-M8 can optionally include where an RPM governor proportional integral derivative controller receives the RPM difference value and applies proportional, integral, and derivative actions to the RPM difference value.

Example S1, is a system including a flight controller for an aircraft that includes an electric motor that drives blades with a variable pitch, where the flight controller receives a command to change a flight characteristic of the aircraft and creates a torque command and a revolutions per minute (RPM) command and a propulsion assembly. the propulsion assembly creates a current command based at least in part on the torque command and the RPM command, creates a blade pitch command based at least in part on the torque command and the RPM command, communicates the current command to the electric motor to change a mechanical output of the electric motor, and communicates the blade pitch command to blade actuators to control the pitch of the blades.

In Example S2, the subject matter of Example S1 can optionally include where the current command and the blade pitch command cause the blades to rotate at a predetermined RPM.

In Example S3, the subject matter of any one of Examples S1-52 can optionally include where the blade pitch command is at least partially based on a determined current RPM measurement of the blades.

In Example S4, the subject matter of any one of Examples S1-53 can optionally include where a lead/lag filter receives the torque command and applies forward path shaping to tailor a bandwidth and a crossover frequency of the torque command.

In Example S5, the subject matter of any one of Examples S1-S4 can optionally include where a torque to collective blade pitch lead module receives the torque command and applies a correction based on a change of torque that the torque command will cause to the electric motor.

In Example S6, the subject matter of any one of Examples S1-S5 can optionally include where the propulsion assembly subtracts a determined current RPM measurement of the blades to create an RPM difference value and an RPM error to torque proportional derivative module receives the RPM difference value and modifies the RPM difference value to increase a bandwidth of the controller by adding an adjustment to the RPM difference value.

In Example S7, the subject matter of any one of Examples S1-S6 can optionally include where an RPM governor proportional integral derivative controller receives the RPM difference value and applies proportional, integral, and derivative actions to the RPM difference value.

Example A1 is a rotorcraft including at least one electric motor, blades with a variable pitch, a flight controller to receive a command to change a flight characteristic of the rotorcraft and create a torque command and a revolutions per minute (RPM) command, and a propulsion assembly. The propulsion assembly is configured to create a current command based at least in part on the torque command and the RPM command, create a blade pitch command based at least in part on the torque command and the RPM command, communicate the current command to the electric motor to change a mechanical output of the electric motor, and communicate the blade pitch command to blade actuators to control the pitch of the blades.

In Example A2, the subject matter of Example A1 can optionally include where the current command and the blade pitch command cause the blades to rotate at a predetermined RPM.

In Example A3, the subject matter of any one of the Examples A1-A2 can optionally include where the propulsion assembly is further configured to determine a current RPM of the blades, where the blade pitch command is at least partially based on the current RPM of the blades.

In Example A4, the subject matter of any one of the Examples A1-A3 can optionally include where the rotorcraft is a drone.

Example AA1 is a method including means for receiving a command to change a mechanical output of an electric motor, where the electric motor drives blades with a variable pitch, means for creating a current command based at least in part on the command to change the mechanical output of the electric motor, means for creating a blade pitch command based at least in part on the command to change the mechanical output of the electric motor, means for communicating the current command to the electric motor to change the mechanical output of the electric motor, and means for communicating the blade pitch command to blade actuators to control the pitch of the blades.

In Example AA2, the subject matter of Example AA1 can optionally include where the current command and the blade pitch command cause the blades to rotate at a predetermined revolutions per minute (RPM).

In Example AA3, the subject matter of any one of the Examples AA1-AA2 can optionally include means for determining a current revolutions per minute (RPM) of the blades, where the blade pitch command is at least partially based on the current RPM of the blades.

In Example AA4, the subject matter of any one of the Examples AA1-AA3 can optionally include means for creating a torque command and a revolutions per minute (RPM) command, where the torque command and the RPM command are at least partially based on the received command to change the mechanical output of the electric motor, where the blade pitch command is at least partially based on the RPM command, means for creating a motor torque command at least partially based on the torque command, and means for creating the current command at least partially based on the motor torque command.

In Example AA5, the subject matter of any one of the Examples AA1-AA4 can optionally include where a lead/lag filter receives the torque command and applies forward path shaping to tailor a bandwidth and a crossover frequency of the torque command.

In Example AA6, the subject matter of any one of the Examples AA1-AA5 can optionally include where a torque to collective blade pitch lead module receives the torque command and applies a correction based on a change of torque that the torque command will cause to the electric motor.

In Example AA7, the subject matter of any one of the Examples AA1-AA6 can optionally include means for determining a current RPM of the blades and means for subtracting the current RPM of the blades from the RPM command to create an RPM difference value.

In Example AA8, the subject matter of any one of the Examples AA1-AA7 can optionally include where an RPM error to torque proportional derivative module receives the RPM difference value and modifies the RPM difference value to increase a bandwidth of the controller by adding an adjustment to the RPM difference value.

In Example AA9, the subject matter of any one of the Examples AA1-AA8 can optionally include where an RPM governor proportional integral derivative controller receives the RPM difference value and applies proportional, integral, and derivative actions to the RPM difference value.

Example X1 is a machine-readable storage medium including machine-readable instructions to implement a method or realize an apparatus as in any one of the Examples A1-A4, AA1-AA8, or M1-M8. Example Y1 is an apparatus comprising means for performing any of the Example methods M1-M8. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A method comprising:
   receiving by a controller a command to change a mechanical output of an electric motor, wherein the electric motor drives blades with a variable pitch;
   creating a current command based at least in part on the command to change the mechanical output of the electric motor;
   creating a blade pitch command based at least in part on the command to change the mechanical output of the electric motor;
   communicating the current command to the electric motor to change the mechanical output of the electric motor;
   communicating the blade pitch command to blade actuators to control a pitch of the blades;
   creating a torque command and a revolutions per minute (RPM) command based on the received command to change the mechanical output of the electric motor, wherein the blade pitch command is at least partially based on the RPM command;
   creating a motor torque command at least partially based on the torque command; and
   creating the current command at least partially based on the motor torque command;
   wherein a lead/lag filter receives the torque command and applies forward path shaping to tailor a bandwidth and a crossover frequency of the torque command; and
   wherein the current command and the blade pitch command cause the blades to rotate at a predetermined revolutions per minute (RPM).

2. The method of claim 1, further comprising:
   determining a current revolutions per minute (RPM) of the blades, wherein the blade pitch command is at least partially based on the current RPM of the blades.

3. The method of claim 1, wherein a torque to collective blade pitch lead module receives the torque command and applies a correction based on a change of torque that the torque command will cause to the electric motor.

4. The method of claim 1, further comprising:
   determining a current RPM of the blades; and
   subtracting the current RPM of the blades from the RPM command to create an RPM difference value.

5. The method of claim 4, wherein an RPM error to torque proportional derivative module receives the RPM difference value and modifies the RPM difference value to increase a bandwidth of the controller by adding an adjustment to the RPM difference value.

6. The method of claim 4, wherein an RPM governor proportional integral derivative controller receives the RPM difference value and applies proportional, integral, and derivative actions to the RPM difference value.

7. A system comprising:
   a flight controller for an aircraft that includes an electric motor that drives blades with a variable pitch, wherein the flight controller receives a command to change a flight characteristic of the aircraft and creates a torque command and a revolutions per minute (RPM) command; and
   a propulsion assembly, wherein the propulsion assembly:
      creates a current command based at least in part on the torque command and the RPM command;
      creates a blade pitch command based at least in part on the torque command and the RPM command;
      communicates the current command to the electric motor to change a mechanical output of the electric motor;
      communicates the blade pitch command to blade actuators to control a pitch of the blades;
      creates a motor torque command at least partially based on the torque command,
      wherein the current command is at least partially based on the motor torque command;
   wherein a lead/lag filter receives the torque command and applies forward path shaping to tailor a bandwidth and a crossover frequency of the torque command; and
   wherein the current command and the blade pitch command cause the blades to rotate at a predetermined revolutions per minute (RPM).

8. The system of claim 7, wherein a torque to collective blade pitch lead module receives the torque command and applies a correction based on a change of torque that the torque command will cause to the electric motor.

9. The system of claim 7, wherein the propulsion assembly subtracts a determined current RPM measurement of the blades to create an RPM difference value and an RPM error to torque proportional derivative module receives the RPM difference value and modifies the RPM difference value to increase a bandwidth of the flight controller by adding an adjustment to the RPM difference value.

10. The system of claim 9, wherein an RPM governor proportional integral derivative controller receives the RPM difference value and applies proportional, integral, and derivative actions to the RPM difference value.

11. A rotorcraft comprising:
    at least one electric motor;
    blades with a variable pitch;
    a flight controller configured to receive a command to change a flight characteristic of the rotorcraft and create a torque command and a revolutions per minute (RPM) command; and
    a propulsion assembly, wherein the propulsion assembly is configured to:
       create a current command based at least in part on the torque command and the RPM command;
       create a blade pitch command based at least in part on the torque command and the RPM command;

communicate the current command to the at least one electric motor to change a mechanical output of the at least one electric motor;
communicate the blade pitch command to blade actuators to control a pitch of the blades;
create a motor torque command at least partially based on the torque command,
wherein the current command is at least partially based on the motor torque command;
wherein a lead/lag filter receives the torque command and applies forward path shaping to tailor a bandwidth and a crossover frequency of the torque command; and
wherein the current command and the blade pitch command cause the blades to rotate at a predetermined revolutions per minute (RPM).

12. The rotorcraft of claim 11, wherein the rotorcraft is a drone.

* * * * *